United States Patent [19]
El-Rabaa et al.

[11] Patent Number: 5,187,332
[45] Date of Patent: Feb. 16, 1993

[54] COUPLING AND RECOVERING SEISMIC DETECTION SENSORS

[75] Inventors: A. Wadood El-Rabaa, Plano; George P. Moeckel, Duncanville; Malcolm K. Strubhar, Irving, all of Tex.

[73] Assignee: Mobil Oil Corporation, Fairfax, Va.

[21] Appl. No.: 833,263

[22] Filed: Feb. 10, 1992

[51] Int. Cl.⁵ ............................................. G01V 1/40
[52] U.S. Cl. .................................... 181/122; 181/401
[58] Field of Search .................. 181/122, 401, 102; 367/911; 507/120, 903; 166/292, 294

[56] References Cited

U.S. PATENT DOCUMENTS

| | | | |
|---|---|---|---|
| 3,489,240 | 1/1970 | Griffith et al. | 181/401 |
| 3,818,991 | 6/1974 | Nimerick | 166/308 |
| 4,534,020 | 8/1985 | O'Brien | 181/401 |
| 4,962,752 | 10/1990 | Reichenberger et al. | 73/644 |
| 5,080,190 | 1/1992 | Owen et al. | 181/122 |

Primary Examiner—Ian J. Lobo
Attorney, Agent, or Firm—Alexander J. McKillop; Charles J. Speciale; George W. Hager, Jr.

[57] ABSTRACT

A seismic system is placed in a predetermined orientation with respect to a surface of a formation, and a low viscosity substance is introduced between the sensor system and the surface of the formation. The substance has a composition formulated for stiffening in situ by increasing viscosity to provide a mechanical bond and an acoustical signal transmission coupling between the sensor system and the formation. After completion of the seismic operation, the stiffened substance is contacted with a stimulus for breaking the stiffened substance and thereby break the mechanical bond. Thereafter, the sensor system is recovered.

25 Claims, 3 Drawing Sheets

COUPLING AND RECOVERING SEISMIC DETECTION SENSORS

BACKGROUND OF THE INVENTION

1. Field of the Invention

The present invention relates to bonding and coupling a seismic sensor system in a position relative to the earth's upper surface or to the inner surface of a borehole for a seismic operation, and to recovering the system after the seismic operation is completed.

2. Description of Prior Art

Multi-element geophone strings are used for seismic data gathering in boreholes for vertical seismic profiling, tomography, and other special applications requiring vertical geophone spreads. It is a common practice to make use of velocity geophone elements in these strings. Satisfactory data recording can only be achieved when each of the velocity geophones is acoustically coupled to the formation in open holes or to the pipe in cased holes. Currently, multi-element geophone strings are equipped with mechanical devices such as bowsprings or mechanical locking arms to firmly press each geophone against the borehole to achieve a desired coupling. However, this method is not feasible for strings containing a large number of geophones because the state of the art permits only about a five-element geophone string with an individual locking arm for each geophone.

Geophone strings with larger number of geophones have been constructed, but these strings usually are cemented inside the borehole or in the annulus between the casing and the borehole formation to achieve coupling. Obviously, the cemented geophones can not be retrieved.

Efficient seismic data gathering along vertical geophone arrays requires a large number of geophones. However, borehole seismic operations that make use of a multi-element geophone string in a single recording session become prohibitively expensive when the geophone string is not retrievable.

SUMMARY OF THE INVENTION

It is an object of the present invention to provide a method of temporarily bonding and acoustically coupling a seismic system to an earthen formation for a seismic operation, and of reversing the bond to recover the seismic system after the operation is completed. It is also an object of the instant invention to provide a recoverable multi-element seismic system that is particularly suited for boreholes or rough rocky upper surface formations.

In accordance with a broad aspect of the present invention a seismic system is placed in a predetermined orientation with respect to a surface of a formation, and a low viscosity substance is introduced between the sensor system and the surface of the formation. The substance has a composition formulated for stiffening in situ by increasing viscosity to provide a mechanical bond and an acoustical signal transmission coupling between the sensor system and the formation. After completion of the seismic operation, the stiffened substance is contacted with a stimulus for breaking the stiffened substance and thereby breaking the mechanical bond. Thereafter, the sensor system is recovered.

In a specific embodiment of the invention, the low viscosity substance is a low viscosity monomer solution premixed with a crosslinking agent and in the form of a water base gel. The gel is placed between a sensor system in a borehole and the formation surface or well casing where a polymerization reaction causes the gel to stiffen, and thereby bond the seismic system in a predetermined orientation with respect to the formation surface with a high degree of acoustical coupling between the system and the surface. Alternately, the monomer solution is mixed with a crosslinking agent in situ at the sensor system and the formation surface to form a stiffened polymer. To remove the seismic system, a suitable chemical gel breaker is applied to the stiffened gel to disintegrate the gel or possibly reverse the polymerization and form a lowered viscosity fluid. In either case, the viscosity of the gel is lowered a sufficient amount to free the seismic system from the borehole surface or the casing for ready recovery.

In another specific embodiment the low viscosity substance is heated wax which is introduced into a borehole between the sensor system and the borehole formation surface or well casing. As the wax cools, it stiffens to bond the seismic system in a predetermined orientation with respect to the formation surface and to provide a high degree of acoustical coupling. After the seismic operation, heat is applied to the wax to reduce the viscosity of the wax a sufficient amount to permit removal of the seismic system.

The foregoing specific embodiments were directed to borehole operations. The present invention also contemplates as another specific embodiment positioning an element or elements of a seismic spread system in an upper surface cavity or cavities, and thereafter placing a low viscosity substance about each element in the cavity(ies). As in the above embodiments, the substance is formulated for stiffening in situ by increasing viscosity to provide a mechanical bond and an acoustical coupling between the elements and the surface of the respective cavity(ies). After a seismic operation, the stiffened substance is contacted with a stimulus for breaking the stiffened substance. Thus, the bond is broken or at least weakened to an extent permitting removal of the element(s).

In accordance with another broad aspect to the present invention, there is provided a system for temporarily bonding a seismic sensor array to a surface of a borehole and coupling the sensor array to the surface for a seismic operation. This system comprises means for retrievably placing the sensor array in a predetermined orientation with respect to the surface which may be the borehole wall or a casing, and means for introducing a low viscosity substance between the sensor array and the surface. The substance has a composition formulated for stiffening in situ to provide a mechanical bond and a signal transmission coupling between the sensor array and the surface. After the seismic operation is completed, the system activates means for contacting the stiffened substance with a stimulus for breaking the stiffened substance. Thus, the bond is broken and the seismic sensor array is retrieved. In a specific embodiment, the low viscosity substance is a gel formulation, and the stimulus is a chemical gel breaker. In another specific embodiment, the low viscosity substance is heated wax, and the stimulus for breaking the stiffened wax is heat.

As used herein and in the appended claims, "break", "breaking" or "breakable" when used with reference to the stiffened substance, e.g. gel or wax, means to reverse the stiffened state of the substance a sufficient amount to break the mechanical bond between the sensor system and the earthen surface or well casing, and thereby permit retrieval of the sensor system. Such "breaking" may take the form of a network of cracks formed in the stiffened gel by a chemical gel breaker, or may be a lowering of viscosity of the gel in the traditional sense. In the specific wax embodiment the stimulus for "breaking" the stiffened wax is heat which reduces the viscosity of the wax.

DESCRIPTION OF SPECIFIC EMBODIMENTS

Figure 1:
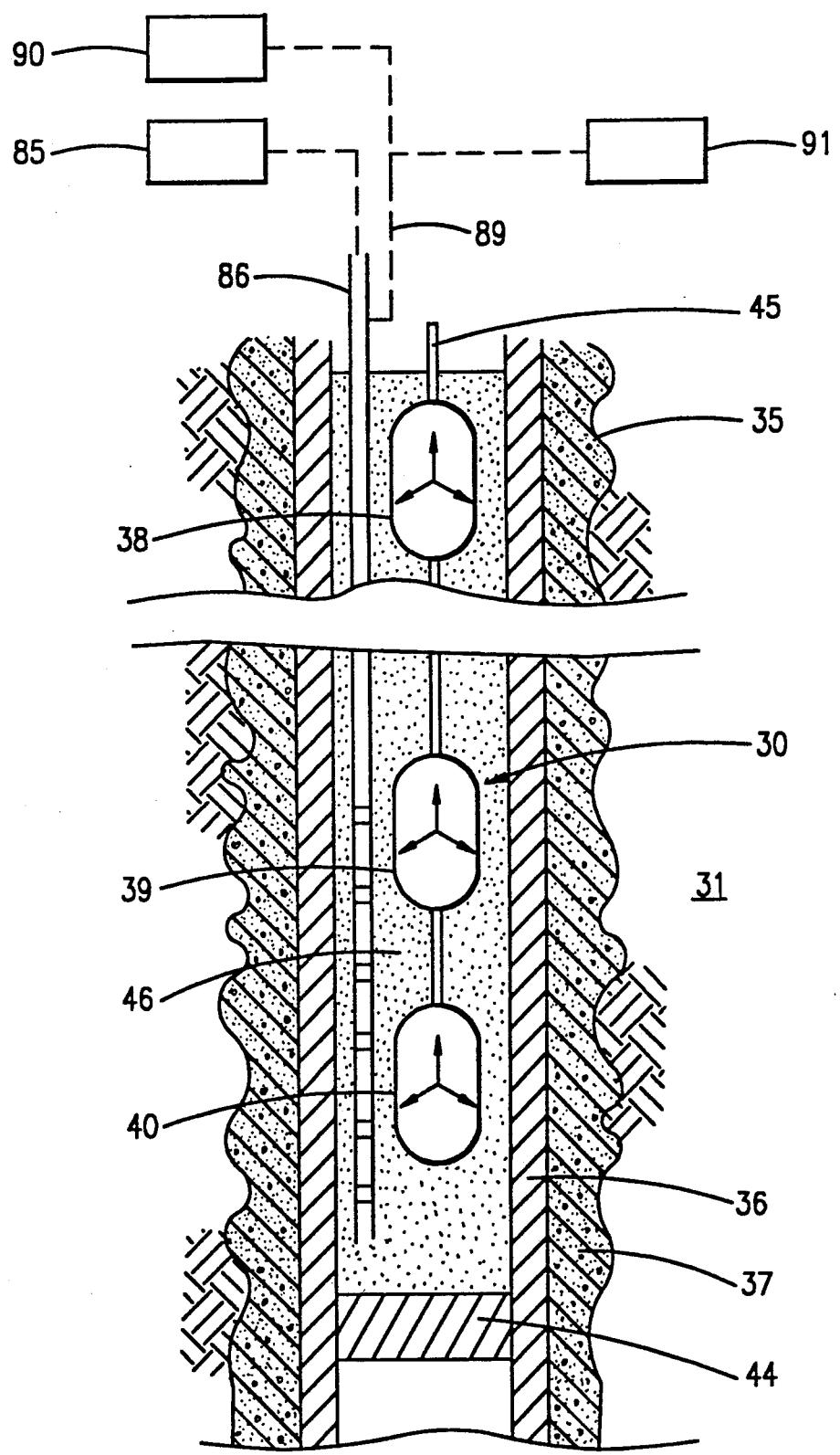
FIG. 1 schematically illustrates an embodiment of the present invention in which a multi-element seismic system is bonded and acoustically coupled to a borehole casing.

Referring to FIG. 1, there is illustrated a seismic system 30 deployed in a borehole 35 formed in a formation 31. The borehole 35 has a steel casing 36 therein with cement 37 filling an annulus between the borehole inner surface 35 and the casing 36. The seismic system 35 has a string of geophones 38-40, only three of which are shown, supported by a cable 45 leading to the upper surface of the formation 31.

A plug 44 is placed or formed in the casing 36 in any one of the many methods known in the art. The plug 44 is an artificial restriction formed in the borehole to hold the low viscosity substance as it stiffens. Generally the plug 44 is a mechanical restriction positioned in the borehole by the drilling pipes or by a wireline. An example of a mechanical plug is shown in U.S. Pat. No. 4,010,803.

In this embodiment, a gel composition 46 of water, a monomer and a crosslinking agent are introduced into the casing 36 to fill the casing 36 from the plug 44 to above the uppermost geophone 38. The monomer polymerizes to stiffen the gel 46 and thus provide a mechanical bond between the geophones 38-40 and the interior surface of the casing 36. The stiffened gel 46 also provides a high degree of acoustical coupling between the geophones 38-40 and the casing 36 which, in turn, is acoustically coupled through the cement 36 to the surface of the borehole 35.

A seismic operation, e.g. vertical seismic profiling or tomography, is performed by first generating acoustic energy by one or more energy sources. The source(s) can be a borehole airgun, or a piezoelectric, magnetostrictive or imploder energy source, or an explosive such as dynamite. The time interval elapsing between the generation of the pulse of acoustic energy and the receipt thereof at the geophones 38-40, which are at known distances from the source(s) of acoustic energy, is a measure of the average velocity of the earth's substructure transversed by the acoustic energy. Upon receipt of the acoustic energy, the geophones 38-40 generate electrical signals which are transmitted back to the earth's surface by the cable 45. This information is extremely useful in generating and interpreting seismograms taken in the area.

Upon completion of the seismic operation, a suitable chemical gel breaker is applied to the stiffened gel to disintegrate the gel or possibly reverse the polymerization and form low viscosity fluid. The seismic system 30 is thus freed and retrievable by pulling the cable 45 up the borehole 35.

Figure 2:
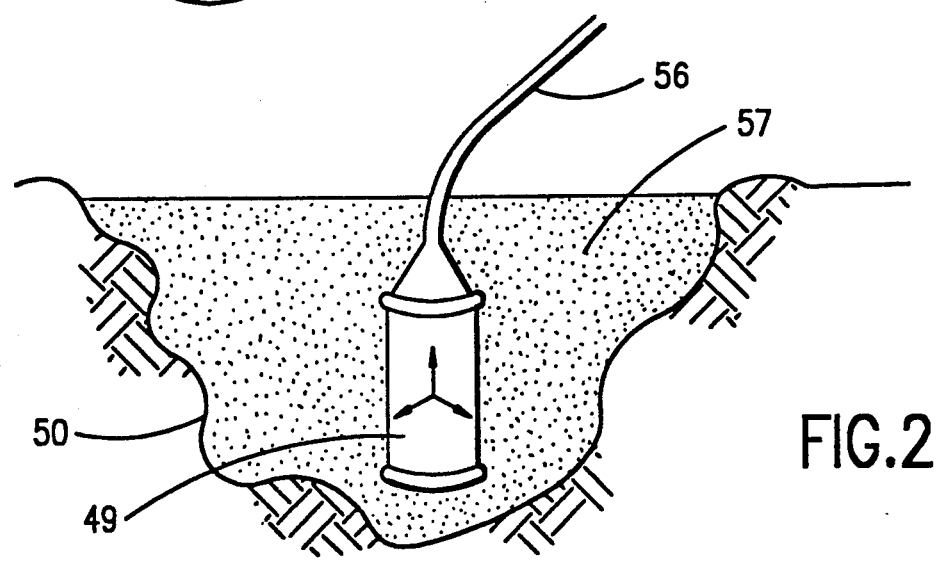
FIG. 2 schematically illustrates another embodiment of the present invention in which an element of a seismic system is bonded and coupled to the interior of a cavity formed in the upper surface of the formation.

FIG. 2 shows one geophone 49 of a seismic system consisting of a surface spread or string of geophones. This embodiment of the present invention is particularly suitable for rough rocky surface terrain where it is difficult to seat a spike portion of a surface geophone. In this embodiment, each geophone 49, where necessary, is positioned in a surface cavity 50, and is connected to the spread or string of geophones by a cable 56. A gel composition 57 of water, a monomer and a crosslinking agent is added to the cavity 50 to cover the geophone 49. As described above with reference to FIG. 1, the monomer polymerizes to stiffen the gel 57, and thereby provides a good mechanical bond and acoustical coupling between the geophone 49 and the cavity 50. After a seismic operation, such as reverse vertical seismic profiling with borehole acoustic sources and surface geophones, a suitable gel breaker is brought into contact with the gel 57 to disintegrate the gel or possibly reverse the polymerization and form a lower viscosity fluid in the cavity 50 to permit ready removal of the geophone 49.

Figure 3:
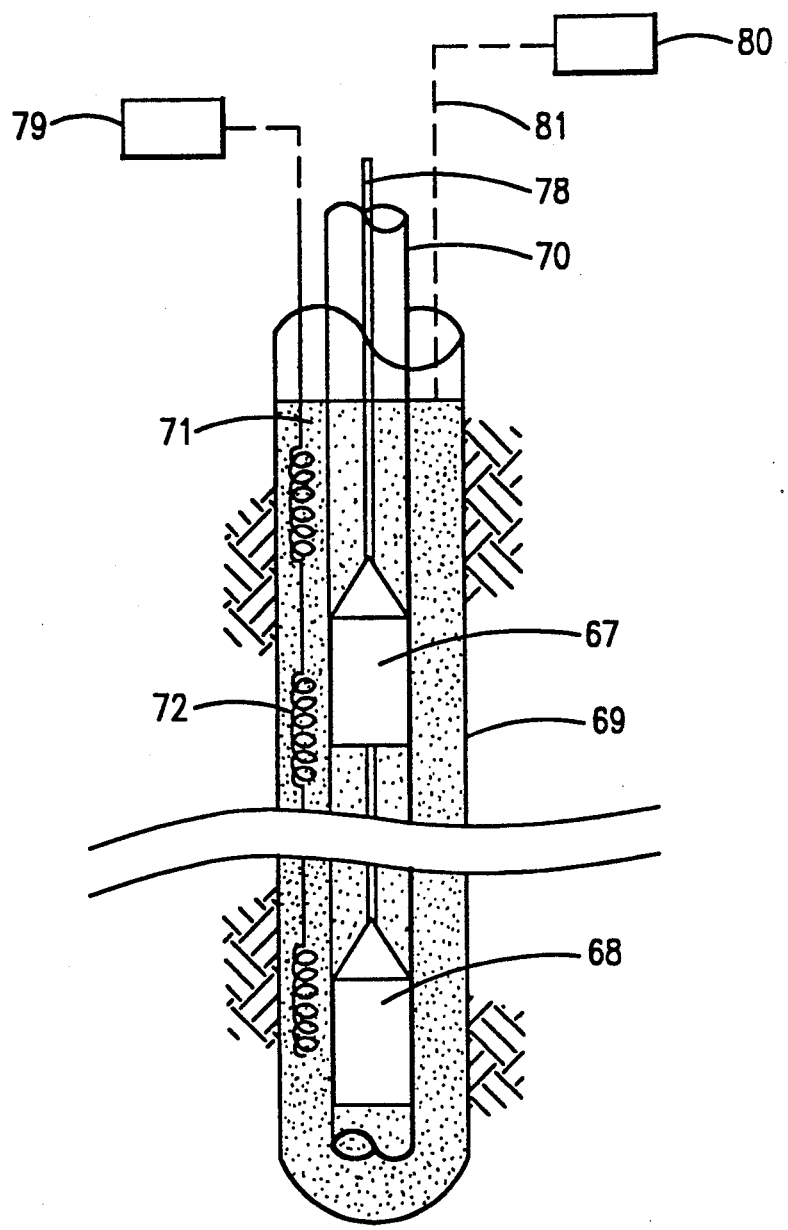
FIG. 3 illustrates still another embodiment of the instant invention in which the elements of a seismic system are located within a retrievable pipe in a borehole.

FIG. 3 is yet another embodiment of the invention, wherein the seismic system comprises a multi-element string of geophones 67, 68, only two of which are shown. The geophones 67, 68 are installed in a borehole 69 by mounting the geophones together with leads on a pipe 70. As described above with reference to FIG. 1, a gel composition 71 is introduced into the borehole 69 and a monomer is polymerized to stiffen the gel 71. The stiffened gel 71 provides a mechanical bond of the pipe 70 to the wall of the borehole 69 and also an acoustic coupling between the pipe 70 and the borehole wall 69. The gel may also be inside the pipe 70. After completion of a seismic operation, a chemical gel breaker is brought into contact with the stiffened gel 71 to disintegrate the gel or possibly reverse the polymerization and lower the viscosity of the gel to permit the retrieval of the pipe 70 and the geophone string 67, 68. The pipe 70 may be composed of PVC, and is retrievable to the surface by a cable 78.

With reference to FIG. 1, the gel forming compositions of the invention can be prepared on the surface in a suitable tank 85 equipped with suitable mixing means, and then pumped down a perforated conduit 86 to the seismic system 30 employing conventional equipment for pumping such compositions.

Additionally, it is within the scope of the invention to prepare these compositions while they are being pumped down the borehole. For example, a solution of the monomer in water can be prepared in the tank 85 adjacent to the borehole. Pumping of this solution through the conduit 86 to the borehole can then be started. Then, downstream from the tank 85, a suitable connection 89 can be provided for introducing a crosslinking agent from another tank 90 in accordance with this invention. As will be understood by those skilled in the art, the rate of introduction of the crosslinking agent into the conduit 89 will depend upon the pumping rate of the monomer solution through the conduit 86. Mixing orifices or baffles can be provided in the conduit 86, if desired.

After the seismic operation is completed, a suitable chemical gel breaker can be pumped from a tank 91, down the conduit 89 to the perforated conduit 86. Alternatively a separate conduit system (not shown) may be provided for introducing the chemical gel breaker.

A gel formulation suitable for use in this invention is an aqueous gel forming composition comprising water, a viscosifying amount of water dispersible polyacrylamide monomer, and a methylene-bis-acrylamide crosslinking agent. The crosslinking agent is present in an amount effective to cause gelation of said monomer. Specifically, the water solution preferably comprises about 30% to about 40% by weight of polyacrylamide monomer, and the methylene-bis-acrylamide crosslinking agent is present in a rate of about 30 pounds to about 40 pounds per 1000 gallons of the water solution. The water solution preferably also comprises about 2% by weight of potassium chloride. An organically crosslinked polyacrylamide gel suitable for this embodiment is manufactured by Halliburton Company under the product name KTROL.

Another gel formulation suitable for use in this invention is an aqueous gel forming composition comprising water, a viscosifying amount of water dispersible polyacrylamide monomer, and a chromium crosslinking agent. The crosslinking agent is present in an amount effective to cause gelation of said monomer. Specifically, the water solution preferably comprises about 30% to about 40% by weight of polyacrylamide monomer, and the chromium crosslinking agent is present in a rate of about 30 pounds to about 40 pounds per 1000 gallons of the water solution. The water solution preferably also comprises about 2% by weight of potassium chloride. A chromium crosslinked polyacrylamide gel suitable for this embodiment is manufactured by Halliburton Company under the product name MATROL.

The stiffness or rigidity of the gel is changeable by varying the amount of the monomer or crosslinking agent. Increasing either will increase the stiffness. Stiffness may also be increased by including very fine suspended solids in the gel. For example, the solution may contain about 10% silica ground to a 200 mesh and commonly known as silica flower. Gelation time may also be changed by use of known activator or retarder chemical additives.

A suitable chemical gel breaker is a hydrogen peroxide solution. Other breakers may be sodium perborate trihydrate or sodium hypochlorite solutions.

The geophones shown in the specific embodiments generate three signal outputs (X;Y;Z) to give a three-dimensional view of wave propagation.

Figure 4:
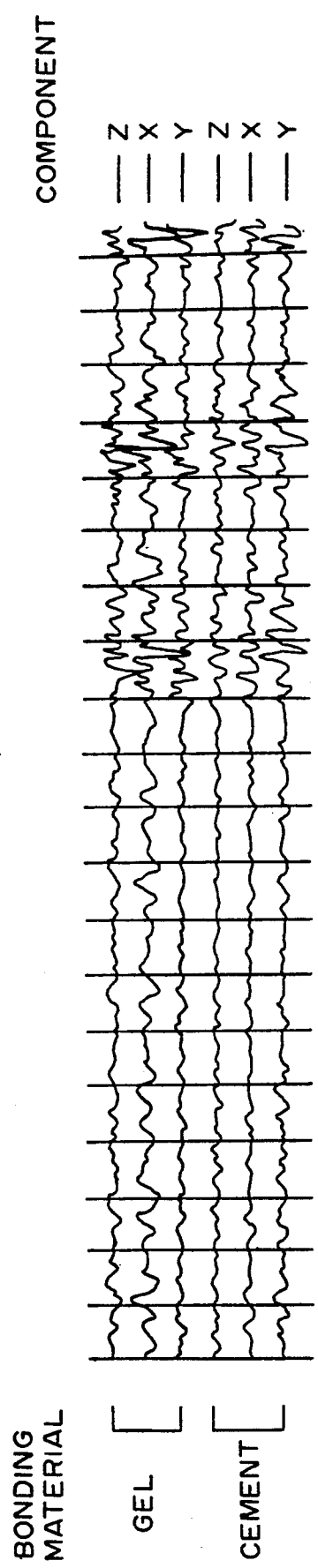
FIG. 4 shows graphic printouts of acoustical responses of a geophone mechanically bonded and acoustically coupled in accordance with an embodiment of the present invention, and of another geophone bonded and coupled by cement in accordance with the prior art.

FIG. 4 shows geophone coupling response traces for a gel and for cement. The experiment was conducted in an horizontal tunnel formed by a percussion jack hammer drill bit. Two geophones were positioned 50 feet up the tunnel and spaced apart 2 feet. One geophone was bonded and acoustically coupled to the tunnel surface by the preferred 40% polyacrylamide aqueous solution described above. This solution satisfactorily stiffened in five hours. The other geophone was bonded and coupled by cement. The printouts show that sonic events recorded beginning at the 13th vertical line and generated by the drill bit were most importantly received by each geophone at the same time. Further, the two traces are also quite comparable in amplitude and frequency for each of the three components of the signals transmitted by each geophone.

Although the above specific embodiments used water based stiffening gels, the present invention contemplates other substances which have a composition formulated to stiffen in situ, and to be breakable when contacted with a reversing stimulus. In addition the substance must also be capable of acoustic coupling, i.e. transmitting without damping particle displacement to the geophone.

For example, the invention also contemplates oil based polymer gel compositions. Also glass forming a reversible bond may be used.

With reference to FIG. 3, in another specific embodiment, strings of heating coils are 72 (only one shown) are positioned in the borehole 69 along the string of geophones 67, 68 and the pipe 70. The coils 72 are powered by an uphole power source 79. Wax is heated in a surface unit 80 and is introduced by a conduit 81 to between the pipe 70 and the borehole formation surface 69. The wax may also be within the pipe 70. As the wax cools, it stiffens to bond the seismic system 67, 68 in a predetermined orientation with respect to the formation surface 69 and to provide a high degree of acoustical coupling. After the seismic operation, heat is applied through the coils 72 to the wax to reduce the viscosity of the wax a sufficient amount to permit removal of the seismic system 67, 68.

Although the above embodiments processed acoustic signals, "seismic" as used herein also contemplates electromagnetic, or accelerometer signal generator-receiver systems.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A system for temporarily bonding a vertical seismic sensor array to an interior surface of a borehole and coupling said sensor array to said surface for a seismic operation comprising:
   a plug formed in said borehole;
   means for retrievably placing said sensor array above said plug and in a predetermined orientation with respect to said surface;
   means for introducing a low viscosity substance between said plug and the uppermost sensor in said sensor array, said substance having a composition formulated for stiffening in situ to provide a mechanical bond and a signal transmission coupling between said sensor array and said surface; and
   means for contacting said stiffened substance with a stimulus for breaking said stiffened substance to thereby remove said bond.

2. The system of claim 1 wherein said substance is a gel formulation, and said stimulus is a chemical gel breaker.

3. The system of claim 2 wherein said gel bonds said sensor array directly to said surface.

4. The system of claim 2 wherein a casing is bonded to said surface by a filling material, and said sensor array is positioned within said casing, whereby said coupling is provided by and though said stiffened gel, said casing and said filling material.

5. The system of claim 4 wherein said filling material is cement.

6. The system of claim 1 wherein said introducing means comprises at least one conduit extending downwardly in said borehole in the vicinity of said sensor array.

7. The system of claim 6 wherein said introducing means further comprises a tank for mixing said composition, said conduit being connected to said tank.

8. The system of claim 6 wherein said conduit is perforated in the vicinity of said sensor array.

9. The system of claim 1 wherein said placing means comprises a pipe and a cable secured to said pipe, and said sensor array is a string of geophones vertically aligned in said pipe and secured thereto, said cable lowering and retrieving said pipe and said string into and out of said borehole.

10. A method of temporarily bonding a string of seismic sensors with respect to the interior surface of a borehole and coupling said string of sensors to said borehole surface for a seismic operation comprising the steps of:
providing a plug in said borehole;
placing said string of sensors above said plug and in a predetermined orientation with respect to said borehole surface;
then introducing a low viscosity substance into said borehole to fill said borehole from said plug to above the uppermost sensor, said substance having a composition formulated for stiffening in situ to provide a mechanical bond and a signal transmission coupling between said sensor system and said borehole surface;
performing said seismic operation after said composition has stiffened;
after completion of said seismic operation, contacting said stiffened substance with a stimulus for reducing said stiffened substance to break or lower the viscosity of said substance and thereby break said bond; and
thereafter retrieving said string of sensors from said borehole.

11. The method of claim 10 wherein said substance is a gel formulation.

12. The method of claim 11 wherein said stimulus is a chemical gel breaker.

13. The method of claim 11 wherein said gel formulation comprises a solution of polyacrylamide monomer and a crosslinking agent present in an amount effective to cause gelation of said polyacrylamide monomer.

14. The method of claim 11 wherein said gel formulation is an aqueous gel forming composition comprising water, a viscosifying amount of a water dispersible polyacrylamide monomer, and a methylene-bis-acrylamide crosslinking agent, said crosslinking agent being present in an amount effective to cause gelation of said monomer.

15. The method of claim 14 wherein said water solution comprises about 30% to about 40% by weight of polyacrylamide, and said methylene-bis-acrylamide is present in a rate of about 30 pounds to about 40 pounds per 1000 gallons of said water solution.

16. The method of claim 15 wherein said water solution further comprises about 2% by weight of potassium chloride.

17. The method of claim 16 wherein said breaking stimulus is a solution selected from the group consisting of hydrogen peroxide, sodium perborate trihydrate and sodium hypochlorite.

18. The method of claim 12 wherein said chemical gel breaker is a solution selected from the group consisting of hydrogen peroxide, sodium perborate trihydrate and sodium hypochlorite.

19. The method of claim 1 wherein said gel formulation is an aqueous gel forming composition, comprising water, a viscosifying amount of water dispersible polyacrylamide monomer, and a chromium crosslinking agent, said crosslinking agent being present in an amount effective to cause gelation of said monomer.

20. The method of claim 10 wherein said substance is wax and said stimulus is heat, and wherein said wax is in a heated state to provide the low viscosity substance for introduction between said sensor systems and said surface.

21. The method of claim 11 wherein said gel bonds said string of sensors directly to the interior surface of said borehole.

22. The method of claim 11 wherein a casing is bonded to the interior surface of said borehole by a filling material, and said string of sensors is positioned within said casing, whereby said coupling is provided by and through said stiffened gel, said casing and said filling material.

23. The method of claim 10 wherein said seismic operation is vertical seismic profiling or tomography.

24. The method of claim 23 wherein said sensor are velocity geophones.

25. The method of claim 10 wherein said string of seismic sensors comprises at least six vertically aligned sensors.

* * * * *